United States Patent [19]

Nixon

[11] 4,281,811

[45] Aug. 4, 1981

[54] PITCH TRIM SYSTEM FOR AIRCRAFT

[75] Inventor: John M. Nixon, Mineral Wells, Tex.

[73] Assignee: Edo-Aire Mitchell, Mineral Wells, Tex.

[21] Appl. No.: 48,788

[22] Filed: Jun. 15, 1979

[51] Int. Cl.³ ............................................. G05D 1/10
[52] U.S. Cl. .................................. 244/178; 318/565; 340/27 AT
[58] Field of Search ..................... 244/178, 76 A, 194, 244/195, 180–181; 340/27 AT; 318/563, 565, 566, 580, 584; 364/434, 435

[56] References Cited

U.S. PATENT DOCUMENTS

| | | | |
|---|---|---|---|
| 3,149,272 | 9/1964 | Dendy | 318/565 |
| 3,378,217 | 4/1968 | Diani | 244/178 |
| 3,568,960 | 3/1971 | Griffith et al. | 244/178 X |
| 3,578,268 | 5/1971 | Kramer | 244/178 X |
| 4,017,045 | 4/1977 | Kirchhein | 318/565 X |

Primary Examiner—J. D. Miller
Assistant Examiner—Reinhard J. Eisenzopf
Attorney, Agent, or Firm—Richards, Harris & Medlock

[57] ABSTRACT

An automatic pitch trim system responds to the output of a torque detector (34) to provide an input signal to a gain normalization circuit (36). A limiter (38) responds to the gain normalization circuit (36) to produce a limited authority trim signal to a summing amplifier (48). Also connected to the normalization circuit (36) is a window generator (42) that responds to the input signal to activate a time delay (46). The time delay (46) generates a control signal to a signal gate (40) having an input connected to the normalization circuit (36). Under the control of the time delay (46), the output of the mormalization circuit (36) is gated through to the summing amplifier (48) to be combined with the output of the limiter (38) into a signal that is applied to a trim servo amplifier (50). The servo amplifier (50) generates an energizing voltage for driving a trim servo motor (44) coupled to trim tabs (52). To detect a malfunction in the automatic trim system, voltages applied to a pitch servo motor (28) and the trim servo motor (44) are input to respective amplifiers (56) and (58) that generate first and second comparison signals to comparison logic (64). When the difference between the first and second comparison signals exceeds a preset limit, the comparison logic (64) drives an output stage (66) to generate a "trim fail" signal to disable the trim servo motor (44).

19 Claims, 5 Drawing Figures

PITCH TRIM SYSTEM FOR AIRCRAFT

TECHNICAL FIELD

This invention relates to an automatic trim system for aircraft, and more particularly to a pitch trim system with limited control gating of trim servo motor operation.

BACKGROUND ART

In normal flight, it is necessary to adjust or trim the controls of an airplane in order to maintain the desired flight attitude without continued manual effort on the part of the pilot, or continued operation of an autopilot. In most aircraft, the pitch control is subject to the greatest movement in order to attain all the necessary flight attitudes. Accordingly, nearly all aircraft are provided with a manually-actuated pitch trim which must be adjusted to large degrees during take-off, climb, approach and landing, and from time to time during normal flight as a result of changes in power settings, changes in the weight of the aircraft due to use of fuel and shift of passengers, or when changing altitude. The manually-operated trim tab systems require a considerable amount of attention, particularly during the approach and landing when the maximum demand is made upon the pilot's attention for other matters.

If the aircraft is not properly trimmed while being controlled by an automatic pilot, the autopilot will be required to continuously exert a corrective force on the controls. This, together with changes in the trim requirements during the course of autopilot, flight, frequently results in relatively high and occasionally excessive loads on the autopilot. In addition to being deleterious to the autopilot, the improper trim of the aircraft can become a hazard because when the autopilot becomes overburdened, the aircraft becomes unstable, and the pilot's first instinct is to quickly de-activate the autopilot. This sometimes results in an abrupt change in the attitude of the aircraft which can be quite hazardous and at best is undesirable.

The pitch control element or elevator of most light aircraft is controlled by a pair of tension cables which extend in generally parallel relationship from the cockpit to the elevators to actuate a bellcrank which is connected to raise and lower the elevators. The manual pitch trim control is usually comprised of a wheel or hand crank which is connected through cables and suitable linkage to a trim tab located on the movable elevator. Operation of the pitch trim control repositions the trim tab in such a manner as to change the aerodynamic effect of the elevator or pitch control element.

Automatic trim systems are available by which an aircraft can be trimmed in flight by exerting by means of a servo motor the pressure necessary to effect the desired flight attitude. Such automatic trim systems receive input commands either from an autopilot or sensors responsive to a pilot's manual input. One such automatic trim system is essentially a proportional device that responds to an input signal to drive a servo motor attached to the elevator trim system of the aircraft. Such proportional systems operate satisfactorily for relatively large out of trim signals; however, for low level out of trim signals the straight proportional system does not always perform satisfactorily.

In accordance with the present invention, an automatic trim system includes within the control loop a nonlinear response versus time function. The nonlinear response versus time function introduces a delay in the high speed response of the trim system.

A problem often overlooked in automatic trim systems occurs when the autopilot is called upon to generate a force for aircraft trim greater than the output of the autopilot. In accordance with the present invention, to insure that the system is always working within limits, an out of trim condition is immediately sensed and a signal with limited authority applied to energize the trim servo motor. This signal of limited authority varies up to plus or minus 20 percent of a normalized out of trim signal.

Also in accordance with the present invention, the primary pitch control signal driving the pitch servo motor and the trim control signal driving the trim servo motor are input to a malfunction detector for controlling the energization of the trim servo motor. The primary control signal and the trim control signal are compared for a difference exceeding a preset limit in magnitude and time, and the existence of this difference indicates a malfunction, identified as a malfunction in the trim system, which is then utilized to generate a voltage to disconnect the automatic trim system.

An automatic trim system in accordance with the present invention for aircraft having a control surface and a trim surface associated with the control surface for changing the effect of the control surface to maintain a desired flight attitude includes a limiter responsive to an input signal that generates a limited trim control signal having a preselected maximum amplitude. A gate responds also to the input signal and to a control signal applied to a control input. Also responding to the input signal is a controller that generates the control signal to the gate. The gate generates a primary trim control signal that is combined with the limited trim control signal output from the limiter where the combination of these signals is a trim servo motor drive voltage.

A trim system control in accordance with the present invention for aircraft having a control surface and a trim surface associated with the control surface for changing the effect of the control surface to maintain a desired flight attitude includes a first input circuit responsive to a trim control signal for generating a first comparison signal. A second input circuit responds to a primary pitch control signal and generates a second comparison signal. Both the first and second comparison signals are input to a comparator that generates a trim disconnect signal when the difference between the comparison signals exceeds a preset level for a preset period of time.

BRIEF DESCRIPTION OF THE DRAWINGS

A more complete understanding of the invention and its advantages will be apparent from the specification and claims and from the accompanying drawings illustrative of the invention.

Referring to the drawings.

DETAILED DESCRIPTION

Figure 1:
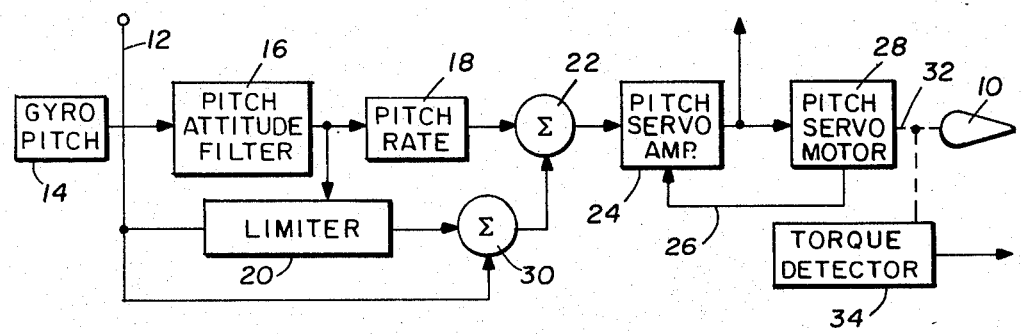
FIG. 1 is a block diagram of the pitch axis control loop of an autopilot for positioning a pitch control surface of an aircraft.

Referring to FIG. 1, there is illustrated the basic elements of an automatic flight control system for controlling an aircraft about it pitch axis by means of a control surface 10. It should be understood that a complete automatic flight control system includes automatic stabilization of the aircraft about its yaw, pitch and roll axis, together with apparatus for generating maneuver commands for automatically controlling the aircraft to approach and maintain predetermined flight paths, such as radio beams, and those flight paths defined by altitude and air speed sensors. Further, automatic flight control systems include a pitch trim channel for positioning trim tabs on an aircraft control surface, and it is to the pitch trim channel that this invention is directed.

The apparatus for generating the maneuver commands, including radio coupler equipment, is conventional hardware and applied command signals to an input terminal 12. Command signals applied to the input terminal 12 would include heading error (computed from a radio signal or a directional gyro) attitude error, altitude error and altitude rate of change and, for guiding an aircraft for a landing approach, glide slope error and glide slope rate. It will be understood that these command signals are generated for either the roll or pitch axis of the aircraft or both. In FIG. 1, the command signals applied to the input terminal 12 are only related to the pitch axis.

The pitch axis channel of FIG. 1 incorporates a pitch gyro 14 that responds to movement of an aircraft about its pitch axis to produce a pitch axis control signal input to a pitch attitude filter 16 that is designed to pass a design range of frequency signals to a pitch rate circuit 18 and to a limiter 20. An output of the pitch rate circuit 18 is a pitch attitude rate signal varying with the output of the gyro 14. This attitude rate signal is input to a summing amplifier 22 that generates a motor velocity signal applied to a pitch servo amplifier 24 that receives as a second input a motor velocity signal on a line 26. The line 26 carries the output of a motor velocity detector that is a part of the pitch servo motor 28. The pitch servo motor 28 is mechanically connected to the control surface 10.

In the servo amplifier 24, the attitude rate signal from the summing amplifier 22 and the motor velocity signal on the line 26 are combined into a motor drive voltage for energizing the servo motor 28. The system will thus control an aircraft about its pitch axis independent of any position feedback from the control surface 10 as in heretofore conventional automatic flight control systems.

Also input to the limiter 20 are the command signals applied to the input terminal 12. The limiter 20 restricts the authority of certain command inputs to the pitch axis channel, which limiter also limits the authority of the control signal from the gyro 14 as output from the pitch attitude filter 16. The authority limit places maximums on angles of flight of an aircraft about the pitch axis. However, not all commands input to the terminal 12 are limited and these are directly input to the summing amplifier 30 that also receives an input from the limiter 20.

An output of the summing amplifier 30 is applied to a second input of the summing amplifier 22. Thus, the summing amplifier 22 produces an attitude rate signal varying with the output of the pitch rate circuit and the output of the summing amplifier 30.

As previously mentioned, the pitch control surface 10 is conventionally controlled by tension cables or other means, illustrated by the linkage 32, coupled to the pitch servo motor 28 and to the control surface 10. The tension in these cables is detected by a proportional torque detector 34 that produces a proportional torque command signal for application to an automatic trim system as part of the aircraft pitch control.

Figure 2:
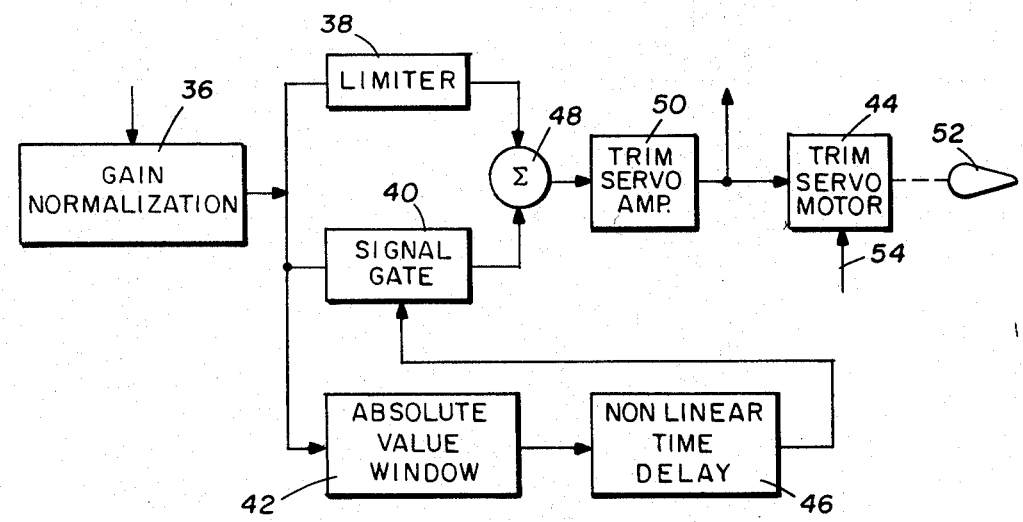
FIG. 2 is a block diagram of an automatic trim system responsive to a torque command from the pitch axis control loop for positioning of a trim surface associated with the pitch control surface.

Referring to FIG. 2, the torque command signal from the torque detector 34 is input to a gain normalization stage 36 that normalizes the torque command signal into a uniform maximum output signal. This normalization is performed to optimize the dynamic range of the detected torque signal used in the automatic trim system.

An output of the gain normalization stage 36 is input to a limiter 38, a signal gate 40, and an absolute value window generator 42. In the limiter 38, the normalized torque command is converted into a limited trim signal having a limited signal swing and limited authority for control of a tirm servo motor 44. Typically, the limiter 38 generates the limited trim signal that limits the velocity of the servo motor 14 to less than plus or minus 5 percent of maximum velocity. Thus, the signal from the limiter 38 has greatly reduced authority for commanding the energization of the trim servo motor 44.

In the absolute value window generator 42 the torque command from the normalization stage 36 is evaluated for a preset range plus or minus a null condition, typically, plus or minus 20 percent of the output of the normalization stage 36. All torque command signals within the range of the value window generator 42 are inhibited and no output is produced at the output of signal gate 40. Whenever the torque command signal exceeds the preset signal range, a signal from the window generator 42 is applied to a nonlinear time delay 46.

The signal applied to the nonlinear time delay 46 starts a time delay period and after this period has expired, a gate control signal is output from the delay 46 and applied to the signal gate 40. Typically, the time delay 46 introduces a two to three second delay after a signal is output from the value window generator 42.

A control signal applied to the signal gate 40 closes the gate, thereby activating this circuitry to generate a primary trim signal having the full dynamic range of the servo loop. This primary control signal is combined in a summing amplifier 48 with the limited trim signal from the limiter 38. The combined signals from the limiter 38 and the gate 40 are input to a trim servo amplifier 50. The trim servo amplifier 50 generates a trim motor energizing voltage to drive the servo motor 44 having an output mechanically coupled to a trim tab surface 52. The trim tab surface 52 is mechanically associated with the control surface 10 and changes the effect of the control surface 10 to maintain a desired flight attitude for an aircraft.

Also input to the trim servo motor 44, which includes the necessary mechanical coupling and clutching for connecting to the trim tab 52, is a trim disconnect signal on a line 54. This trim disconect signal disconnects the output of the servo motor 44 from the trim tab control surface 52. The trim disconnect signal is output from the trim system malfunction detector of FIG. 3.

In operation of the pitch trim system of FIG. 2, a torque command input to the gain normalization stage 36 is normalized to vary over a percentage of the range of the system. This output of the normalization stage 36 is input to the limiter 38, the signal gate 40 and the absolute value window generator 42. A signal of limited authority is output from the limiter 38 and combined in the summing amplifier 48 with the output of the signal 40. For a normalized torque command signal within the range of plus or minus 20 percent of the total range of the normalized input signal no output appears at the signal gate 40 and the output of the summing amplifier 48 follows the output of the limiter 38. This output of the summing amplifier 48 is input to the trim servo amplifier 50 that generates an energizing voltage to the trim servo motor 44.

When the torque command as normalized at the output of the gain normalization stage 36 exceeds the plus or minus 20 percent of total range, a signal is generated at the output of the absolute value window generator 42 to activate a nonlinear time delay 46. After expiration of the preset time delay, a gate control signal from the delay 46 closes the signal gate 40. The summing amplifier 48 now combines the output of the limiter 38 with the output of the signal gate 40. The trim servo motor amplifier 50 receives the summation of these two signals to generate a trim motor drive voltage for energizing the trim servo motor 44. To enable the time delay 46 to be again ready to delay the output of the value window generator 42, the time delay 46 is configured to have a fast reset.

Figure 3:
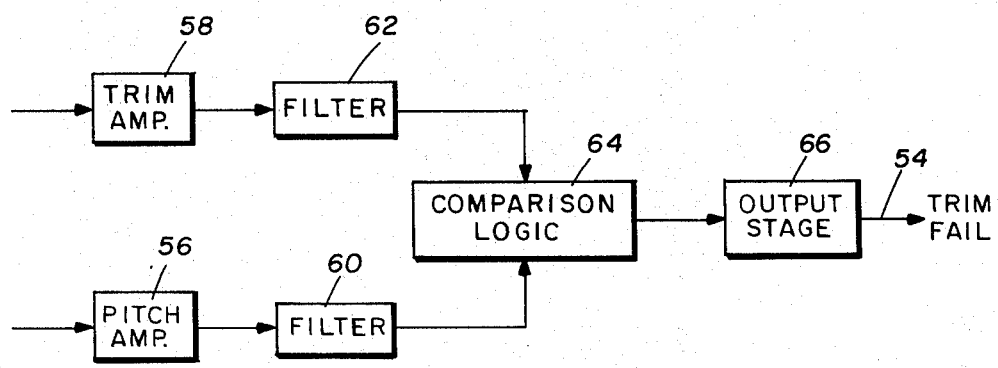
FIG. 3 is a block diagram of a trim system malfunction detector responsive to a signal driving the pitch servo motor of FIG. 1 and a signal driving the trim servo motor of FIG. 2.

Referring to FIG. 3, operation of the pitch channel of FIG. 1 and the automatic trim system of FIG. 2 is monitored for malfunction by coupling the output of the pitch servo amplifier 24 to a pitch amplifier 56 and coupling the output of the trim servo amplifier 50 to a trim amplifier 58. The amplifiers 56 and 58 are similar and provide amplification signals to filters 60 and 62, respectively. The filter 60 generates a first comparison signal input to comparison logic 64 and the filter 62 generates a second comparison signal, also input to the comparison logic. Thus, the amplifier 56 and filter 60 take the output of the pitch servo amplifier 24 and convert it into a first comparison signal input to the comparison logic 64. Similarly, the trim amplifier 58 and the filter 62 respond to the output of the trim servo amplifier 50 to generate a second comparison signal to the comparison logic 64.

Within the comparison logic 64 the first comparison signal and the second comparison signal are evaluated for the difference therebetween. When the difference exceeds a preset level, indicating that a malfunction has occurred in the pitch/trim channel, an output is generated from the comparison logic 64 and input to an output stage 66. The output stage 66 generates a trim fail signal that is applied on line 54 to the trim servo motor 44. This trim fail signal actuates mechanism within the trim servo motor 44 to decouple the motor from the trim tab surfaces 52. Thus, whenever the difference between the first comparison signal and the second comparison signal exceeds a preset difference the automatic trim system of FIG. 2 is disabled.

Figure 4:
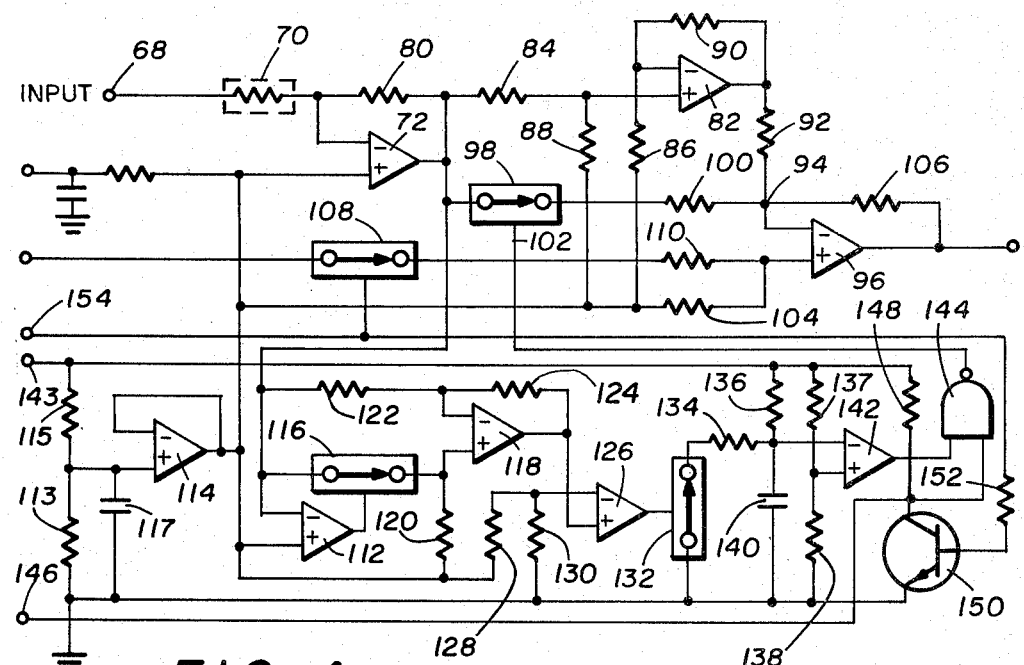
FIG. 4 is a schematic of one embodiment of the automatic pitch trim system of FIG. 2.

Referring to FIG. 4, there is shown a schematic of the pitch trim system of FIG. 2 wherein the output of the torque detector 34 is applied to an input terminal 68 connected to an input resistor 70 for an operational amplifier 72. A second input to the amplifier 72 is a trim reference signal at the output of a reference amplifier 114. The reference amplifier 114 has an input connected to a resistance divider consisting of resistors 113 and 115, the latter in parallel with a capacitor 117. A feedback loop for the amplifier 72 includes a feedback resistor 80.

An output of the operational amplifier 72 represents a normalized value of the input signal applied to the terminal 68. This output is applied to three separate channels of the circuit of FIG. 4. One such channel includes a limiter amplifier 82 connected to the amplifier 72 through an input resistor 84. A second input to the amplifier 82 is the trim reference at the amplifier 114 as applied through a resistor 86. The trim reference is also applied to the noninverting terminal of the amplifier 82 by means of a resistor 88. Connected to the feedback loop of the amplifier 82 is a resistor 90. An output of the amplifier 82 is applied through a resistor 92 to a summing junction 94 that is tied to the inverting input terminal of an amplifier 96.

A second channel connected to the output of the amplifier 72 includes a gate switch 98 for controlling the coupling of the output of the amplifier 72 to the summing junction 94 through a resistor 100. The gate switch 98 is controlled by a voltage on a line 102 from a nonlinear time delay as will be explained.

A second input to the amplifier 96 is the trim reference at the amplifier 114 as applied through an input resistor 104. A feedback loop for the amplifier 96 includes a resistor 106. To test the operation of the amplifier 96, a test signal is input through a switch 108 connected to a resistor 110 that in turn is tied to the noninverting input terminal of the amplifier 96. The switch 108 is controlled by a test signal applied to a terminal 154.

The third channel connected to the output of the amplifier 72 includes an amplifier 112 for comparing the output of the amplifier 72 with the reference voltage at the output of the amplifier 114. Also connected to the output of the amplifier 72 is a gate switch 116 having a control line connected to the output of the amplifier 112. By operation of the gate switch 116 and the amplifier 112 an absolute value function is generated between the output of the amplifier 72 and the output of an amplifier 118. The noninverting terminal of the amplifier 118 is also tied to the reference signal at the output of the amplifier 114 through a resistor 120. A second input to the amplifier 118 is the output of the amplifier 72 coupled through an input resistor 122. To complete the circuit for the amplifier 118, the resistor 124 is connected in the feedback loop.

An output of the amplifier 118 is applied to one input of a comparator 126 having a second input connected to the reference signal through a resistor 128. A bias resistor 130 is tied to the interconnection of the resistor 128 and the inverting terminal of the comparator 126, this bias resistor is also tied to ground.

A voltage produced at the output of the comparator 126 controls a gate switch 132 connected at one terminal to ground and at a second terminal to a resistor 134 as part of a timing circuit that includes resistors 136 through 138 and a capacitor 140. The interconnection of the resistors 134 and 136 and the capacitor 140 is tied to one input of a comparator amplifier 142. A second input of the amplifier 142 is tied to the interconnection of the resistors 137 and 138. Resistors 136 and 137 are tied to a regulated voltage supply at a terminal 143 and the resistor 138 and capacitor 140 are tied to ground.

Connected to the output of the amplifier 142 is a NAND gate 144 providing the control signal on the line 102 to the gate switch 98. Also connected to an input of the NAND gate 142 is a TRIM control signal applied to an input terminal 146. The TRIM control signal applied to the terminal 146 conditions the pitch trim system of FIG. 4 into a "no trim delay" condition. That is, the third channel of the system of FIG. 4 is bypassed and the gate 144 generates the control signal to the gate switch 98 when a control signal is applied to the terminal 146. Also connected to the NAND gate 144 is a drive resistor 148 that is also tied to a transistor 150 having an emitter electrode grounded. A base electrode of the transistor 150 is connected through a drive resistor 152 to a "Test Enable" signal applied to the system at the terminal 154. This "Test Enable" signal also controls the switch 108 to apply a test voltage to the amplifier 96.

Operationally, the system of FIG. 4 functions as described previously with regard to FIG. 2. The output of the amplifier 96 is applied to the trim servo amplifier 50 for energizing the trim servo motor 44 in accordance with the output of the torque detector 34.

Figure 5:
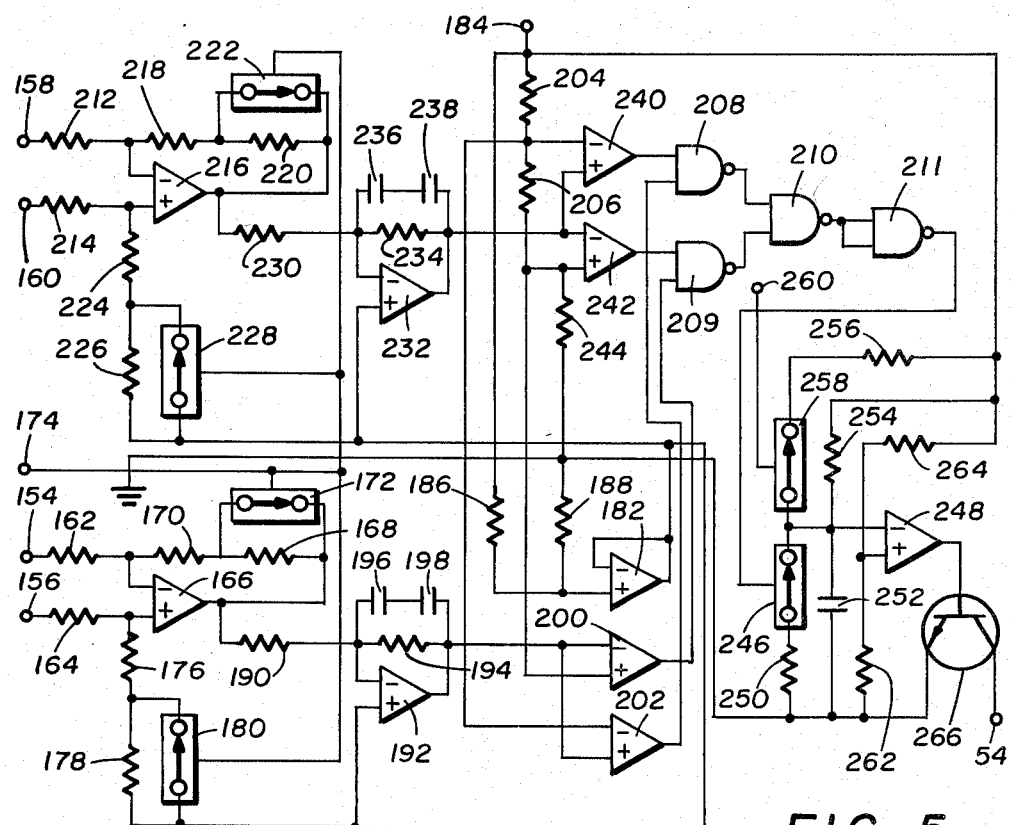
FIG. 5 is a schematic diagram of the trim system malfunction detector of FIG. 3.

Referring to FIG. 5, there is shown a schematic of the malfunction detector of FIG. 3 wherein the voltage for energizing the pitch servo motor 28 is applied to input terminals 154 and 156 and the voltage for energizing the trim servo motor 44 is applied to input terminals 158 and 160. A voltage applied to the input terminals 154 and 156 is input through resistors 162 and 164 to an amplifier 166.

In the feedback path for the amplifier 166 are feedback resistors 168 and 170, with the resistor 168 shunted by a switch 172.

In the embodiment of the malfunction detector of FIG. 5, the system is configured to operate at one of two different supply voltage levels. When operating at the lower of the two supply voltages, a signal at an input terminal 174 closes the switch 172 to shunt the resistor 168 from the feedback path for the amplifier 166.

Also connected to the noninverting terminal of the amplifier 166 is a reference voltage as developed across resistors 176 and 178, the latter shunted by a switch 180 connected to the terminal 174.

The reference voltage connected to the resistors 176 and 178 is generated at the output of an amplifier 182. The amplifier 182 is connected to a regulated voltage supply at a terminal 184 through a resistor 186. A voltage at the input of the amplifier 182 is developed across the resistor 186 in series with a resistor 188, the latter connected to ground.

An output of the amplifier 166 is applied through a resistor 190 to the input of a filter amplifier 192 having a noninverting terminal connected to the output of the amplifier 182. A feedback path for the amplifier 192 includes an RC filter that consists of a resistor 194 in parallel with series capacitors 196 and 198. The filtered output of the amplifier 192, that varies with the voltage applied to the pitch motor 46, is input to comparators 200 and 202. The output of the amplifier 192 is connected to the inverting terminal of the comparator 200 and the noninverting terminal of the comparator 202.

Also connected to the comparators 200 and 202 is a reference voltage, where the voltage applied to the comparator 200 is developed at the tie point of resistors 206 and 244, and the voltage applied to the comparator 202 is developed at the interconnection of resistors 204 and 206.

By operation of the comparators 200 and 202, logic level signals are generated at the output of these amplifiers for input to comparison logic consisting of NAND gates 208 through 211. Also connected to the NAND gate logic is the output of amplifiers for the trim motor channel of the malfunction detector.

A voltage applied to the trim servo motor 44 from the output of the servo amplifier 50 is input through resistors 212 and 214 to a trim amplifier 216. The trim amplifier 216 includes a feedback path consiting of resistors 218 and 220, with the latter shunted by a switch 222 connected to the terminal 174. Also connected to the noninverting terminal of the amplifier 216 is the reference voltage output of the amplifier 182 through resistors 224 and 226, with the latter shunted by a switch 228 connected to the terminal 174. Thus, the trim motor channel of the detector of FIG. 5 also includes provisions for operating at one of two voltage supply levels.

An output of the amplifier 216 is coupled through a resistor 230 to a filter amplifier 232 having a noninverting terminal connected to the reference voltage output of the amplifier 182. The feedback path for the amplifier 232 includes an RC filter consisting of a resistor 234 in parallel with series capacitors 236 and 238.

Connected to the output of the filter amplifier 232 are comparator 240 and 242 for generating inputs to the comparison logic. These two amplifiers are connected to the resistance network including resistors 204, 206 and 244.

By operation of the amplifiers 240 and 242 logic level signals are generated as inputs to the NAND gates 208 and 209. Thus, inputs to the NAND gates 208 and 209 consist of outputs of the comparators 200 and 202 and comparators 240 and 242.

The NAND gates 208 and 209 generate logic level outputs that are applied to the NAND gate 210 which has an output driving the NAND gate 211. The output of the NAND gate 211 changes when a preset difference exists between the voltage applied to the pitch servo motor 28 and the trim servo motor 44, as input to the terminals 154, 156, 158 and 160.

Connected to the output of the NAND gate 211 is a gate switch 246 having one terminal tied to an output amplifier 248. The switch 246 is part of the input circuit to the inverting terminal of the amplifier 248 and controls the connection of a resistor 250 to the amplifier. In parallel with the resistor 250 is a capacitor 252 also connected to the amplifier 248. In series with the capacitor 252 is a resistor 254 connected to the regulated supply voltage at the terminal 184. In parallel with the resistor 254 is a test resistor 256 that is in series with a switch 258 controlled by a test signal applied to a terminal 260. A test signal is applied to terminal 260 to check the initial operation of the detector of FIG. 5.

Tied to the noninverting terminal of the amplifier 248 is a resistance divider including a resistor 262 in series with a resistor 264. This resistance divider establishes the input level to the noninverting terminal.

An output of the amplifier 248 drives a transistor 266 having a grounded emitter electrode and a collector electrode connected to the line 54 for controlling the coupling of the trim servo motor 44 to the control surface 52.

By operation of the malfunction detector of FIG. 5, when the voltage difference applied to the terminals 154, 156, 158 and 160 is within a preset difference, a normal trim signal is generated on the line 54 thereby allowing normal operation of the trim system of FIG. 2. Whenever these voltages exceed the preset differential as monitored by the comparison logic consisting of the NAND gate logic 208 through 211, the amplifier 248 drives the transistor 266 to generate a trim fail signal on the line 54. This decouples the trim servo motor 44 from the control surface 52, thereby disabling the system of FIG. 2. However, the pitch trim system of FIG. 1 continues to function in the normal manner.

While only one embodiment of the invention, together with modifications thereof, has been described in detail herein and shown in the accompanying drawings, it will be evident that various further modifications are possible without departing from the scope of the invention.

I claim:

1. An automatic trim system for aircraft having a control surface and a trim surface associated with the control surface for changing the effect of the control surface to maintain a desired flight attitude, comprising:
    limiter means responsive to an input signal and generating a limited authority trim control signal having a preselected maximum amplitude,
    gating means responsive to the input signal and having a control input, said gating means generating a primary trim control signal varying with the input signal in accordance with a control signal applied thereto,
    control means responsive to the input signal and generating the control signal, and
    means for combining the limited trim control signal and the primary trim control signal into a trim servo motor drive voltage.

2. An automatic trim system for aircraft as set forth in claim 1 including a servo motor responsive to the drive voltage and coupled to the trim surface.

3. An automatic trim system for aircraft as set forth in claim 1 wherein said control means includes a window generator responsive to the input signal for controlling the generation of the control signal in accordance with the amplitude of the input signal.

4. An automatic trim system for aircraft as set forth in claim 3 wherein said control means further includes time delay means for delaying the generation of the control signal.

5. An automatic trim system for aircraft as set forth in claim 4 wherein said time delay means includes means for fast resetting of the delay.

6. An automatic trim system for aircraft as set forth in claim 3 wherein said window generator includes means for limiting the generation of the control signal for an input signal of less than maximum amplitude.

7. An automatic trim system for aircraft having a control surface and a trim surface associated with the control surface for changing the effect of the control surface to maintain a desired flight attitude, comprising:
    a first servo motor for positioning the control surface in accordance with a first servo drive voltage,
    a torque detector responding to the output of the first servo motor and generating a control surface torque command,
    limiter means responsive to the torque command and generating a limited authority trim control signal having a peselected maximum amplitude,
    gating means responsive to the torque command and having a control input, said gating means generating a primary trim control signal varying with the torque command in accordance with a control signal applied to the control input,
    control means responsive to the torque command and generating the control signal, and
    means for combining the limited trim control signal and the primary control signal into a trim servo motor drive voltage.

8. An automatic trim system for aircraft as set forth in claim 7 including means for normalizing the torque command, and wherein said limiter means, gating means and control means respond to the normalized torque command.

9. An automatic trim system for aircraft as set forth in claim 7 including a second servo motor for positioning the trim surface in accordance with the motor drive voltage.

10. An automatic trim system for aircraft as set forth in claim 9 including means for decoupling the second servo motor from the trim surface.

11. An automatic trim system for aircraft as set forth in claim 7 including a malfunction detector responsive to the first servo drive voltage and the trim servo drive voltage to generate a trim disconect signal when the difference between the first servo drive voltage and the trim servo motor drive voltage exceeds a preset limit.

12. A trim system control for aircraft having a control surface and a trim surface associated with the control surface for changing the effect of the control surface to maintain a desired flight attitude, comprising:
    a first control loop including amplifier means generating a trim motor voltage output connected to a trim motor,
    a second control loop including amplifier means for generating a pitch motor voltage output connected to a pitch motor,
    first input means responsive to the trim motor voltage and generating a first comparison signal,
    second input means responsive to the pitch motor voltage and generating a second comparison signal, and
    comparison means responsive to the first and second comparison signals to generate a trim disconnect signal to said first control loop when the difference between the comparison signals exceeds a preset level.

13. A trm system control for aircraft as set forth in claim 12 wherein said first and second input means each includes a filter generating the respective comparison signal at an output thereof.

14. A trim system control for aircraft as set forth in claim 12 wherein said comparison means includes gating logic and amplifier means responsive to each of the comparison signals to generate logic level voltage to the gating logic.

15. A trim system control for aircraft as set forth in claim 14 including an output stage coupled to the gating logic and responsive to an output thereof for generating the trim disconnect signal.

16. A trim system control for aircraft having a control surface and a trim surface associated with the control surface for changing the effect of the control surface to maintain a desired flight attitude, comprising:
    a first control loop including amplifier means generating a first servo drive voltage,
    a second control loop including amplifier means generating a trim motor drive voltage,
    a first servo motor for positioning the control surface in accordance with the first servo drive voltage, a second servo motor for positioning the trim surface in accordance with the trim motor drive voltage, and detector means responsive to the trim motor drive voltage and the first servo drive voltage for generating a trim disconnect signal to the second control loop when the difference between the two drive voltages exceeds a preset level.

17. A trim system control for aircraft as set forth in claim 16 wherein said detector means includes:

first input means responsive to the trim motor drive voltage and generating a first comparison signal, second input means responsive to the first servo drive voltage and generating a second comparison signal, and comparison means responsive to the first and second comparison signals to generate the trim disconnect signal when the difference between the comparison signals exceeds the preset level.

18. A trim system control for aircraft as set forth in claim 17 wherein said comparison means includes gating logic and amplifier means responsive to each of the comparison signals to generate logic level voltages to the gating logic.

19. A trim system control for aircraft as set forth in claim 18 including an output stage coupled to the gating logic and responsive to an output thereof for generating the trim disconnect signal.

* * * * *

UNITED STATES PATENT AND TRADEMARK OFFICE
CERTIFICATE OF CORRECTION

PATENT NO. : 4,281,811
DATED : August 4, 1981
INVENTOR(S) : John M. Nixon

It is certified that error appears in the above-identified patent and that said Letters Patent are hereby corrected as shown below:

Column 1, line 32, after "autopilot" delete ",".
Column 3, line 11, change "it" to --its--.
Column 4, line 27, change "tirm" to --trim--
Column 5, line 11, before "40" insert --gate--.
Column 8, line 28, change "comparator" to --comparators--.
Column 8, line 41, change "voltage" to --voltages--.
Column 9, line 65, change "peselected" to --preselected--.
Column 10, line 23, change "disconect" to --disconnect--.
Column 10, line 46, change "trm" to --trim--.
Column 10, line 53, change "voltage" to --voltages--.

Signed and Sealed this

Eighth Day of December 1981

[SEAL]

Attest:

GERALD J. MOSSINGHOFF

Attesting Officer    Commissioner of Patents and Trademarks